(12) United States Patent
Kumar et al.

(10) Patent No.: US 11,019,543 B2
(45) Date of Patent: May 25, 2021

(54) METHODS AND SYSTEM FOR MANAGING HANDOVER PROCEDURE IN A RADIO ACCESS NETWORK

(71) Applicant: Samsung Electronics Co., Ltd., Gyeonggi-do (KR)

(72) Inventors: Naveen Kumar, Bangalore (IN); Sunil Kumar, Bangalore (IN); Karthikeyan Subramaniam, Bangalore (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/394,693

(22) Filed: Apr. 25, 2019

(65) Prior Publication Data

US 2019/0335370 A1 Oct. 31, 2019

(30) Foreign Application Priority Data

Apr. 25, 2018 (IN) .................. 201841015619 PS
Apr. 10, 2019 (IN) .................. 201841015619 CS

(51) Int. Cl.
*H04W 36/02* (2009.01)
*H04W 36/38* (2009.01)
(Continued)

(52) U.S. Cl.
CPC ....... *H04W 36/026* (2013.01); *H04W 36/023* (2013.01); *H04W 36/03* (2018.08);
(Continued)

(58) Field of Classification Search
CPC . H04W 36/026; H04W 36/023; H04W 36/38; H04W 36/08; H04W 36/03; H04W 88/04
See application file for complete search history.

(56) References Cited

U.S. PATENT DOCUMENTS 10,531,511 B2 * 1/2020 Lee .................. H04W 76/23
2013/0242866 A1 * 9/2013 Lin .................... H04B 7/26
370/328
(Continued)

FOREIGN PATENT DOCUMENTS

WO WO 2010/123309 10/2010
WO WO 2017/166242 10/2017

OTHER PUBLICATIONS

Gabor Fodor et al. "A Comparative Study of Power Control Approaches for Device-to-Device Communications", IEEE ICC 2013—Wireless Networking Symposium, pp. 1-6.

*Primary Examiner* — Andrew Lai
*Assistant Examiner* — Mohammed M Murshid
(74) *Attorney, Agent, or Firm* — The Farrell Law Firm, P.C.

(57) ABSTRACT

A method for managing handover procedure in a radio access network (RAN) includes initiating, by a source base station, a handover procedure for a first user equipment with a target base station, wherein the first user equipment is connected to the source base station; identifying, by the source base station, a second user equipment that functions as a relay device, for relaying data related to the first user equipment from the source base station to the first user equipment during the handover procedure; establishing, by the source base station, a first connection between the identified second user equipment and the first user equipment; transmitting, by the source base station, buffered data corresponding to the first user equipment, to the target base station; transmitting, by the source base station, at least one block of data from the buffered data to the first user equipment, via the second user equipment, during the handover procedure for the first user equipment from the source base station to the target base station; and disconnecting, by the source base station, the established first connection (Continued)

between the second user equipment and the first user equipment, upon receiving a sequence number (SN) status request message from the target base station.

18 Claims, 12 Drawing Sheets

(51) Int. Cl.
*H04W 36/08* (2009.01)
*H04W 36/00* (2009.01)
*H04W 88/04* (2009.01)

(52) U.S. Cl.
CPC ........... *H04W 36/08* (2013.01); *H04W 36/38* (2013.01); *H04W 88/04* (2013.01)

(56) References Cited

U.S. PATENT DOCUMENTS

| | | | | |
|---|---|---|---|---|
| 2013/0315079 | A1* | 11/2013 | Edge | H04L 65/1016 370/252 |
| 2014/0376489 | A1* | 12/2014 | Lee | H04L 1/1607 370/329 |
| 2016/0262066 | A1* | 9/2016 | Ozturk | H04W 74/0833 |
| 2017/0171780 | A1* | 6/2017 | Bhattacharya | H04W 28/22 |
| 2018/0035354 | A1* | 2/2018 | Martin | H04W 40/22 |
| 2018/0176845 | A1* | 6/2018 | Visuri | H04W 36/0072 |
| 2018/0324823 | A1* | 11/2018 | Martin et al. | |
| 2019/0373519 | A1* | 12/2019 | Yiu | H04W 36/08 |
| 2020/0068380 | A1* | 2/2020 | Wallentin | H04W 68/005 |

\* cited by examiner

METHODS AND SYSTEM FOR MANAGING HANDOVER PROCEDURE IN A RADIO ACCESS NETWORK

CROSS-REFERENCE TO RELATED APPLICATION(S)

This application is based on and claims priority under 35 U.S.C. § 119 to Indian Provisional Patent Application No. 201841015619 (PS), filed on Apr. 25, 2018, in the India Intellectual Property Office, and Indian Complete Patent Application No. 201841015619 (CS), filed on Apr. 10, 2019, in the Indian Intellectual Property Office, the entire disclosures of which are incorporated by reference herein in their entirety.

BACKGROUND

1. Field

The present disclosure relates generally to the field of wireless communication networks, and more particularly to data forwarding methods and systems for reducing a handover interruption time (HIT) in a wireless communication network.

2. Description of Related Art

Currently, fifth generation (5G) wireless communication networks are expected to support a broad range of emerging applications, in addition to regular cellular mobile broadband services. For example, 5G communication networks can be used in applications such as wireless control and industrial automation, autonomous driving, cellular services, multimedia content, inter-vehicular communications for improved safety and efficiency, and tactile internet. For sensitive applications (such as autonomous driving and robotic surgery), mobility interruption time should be the shortest time duration supported by the network in which a user terminal/equipment cannot exchange data packets with another base station while transitioning from one cell to another cell.

FIG. 1A illustrates a block diagram of conventional user plane radio protocol stack for layer 2 evolved user equipment (UE)-to-network relay.

In the protocol stack for UE-to-network relay, the L2 relay UE may have radio interfaces for an evolved node B (eNB) and a remote UE 1. Further, the L2 relay UE may relay internet protocol (IP) packets between the remote UE 1 and the network at an IP layer. The L2 relay UE may relay traffic between Uu and PC5 interfaces, and may perform traffic mapping. More specifically, the L2 relay UE may map uplink/downlink (UL/DL) packets to side link (SL) packets and vice versa. Further, the mapping may be essential for proper packet routing and quality-of-service (QoS) treatment. For SL to UL mapping, which occurs when the L2 relay UE receives traffic from the remote UE 1 over the SL, the L2 relay UE may use uplink traffic flow templates (TFTs) to select uplink packets to carry the received traffic over UL. For DL to SL mapping, which occurs when the L2 relay UE receives traffic from the eNB, whether the packet has to be relayed is identified by referring to the destination IP address of the packet. The L2 relay UE may then assign a priority value called proximity services (ProSe) per packet priority (PPPP) to the received packet. The priority assignment may be based on the mapping information representing the association between the QoS class identifier (QCI) values of DL packets and the priority value. Further, the QCI-to-priority mapping information is provisioned to the L2 relay UE by the network.

FIG. 1B illustrates a signaling diagram for a conventional handover operation and HIT required by a long term evolution (LTE) network.

In step 1, a radio resource control (RRC) connection reconfiguration (handover (HO) command) may be performed when the UE receives the RRC connection reconfiguration message with necessary parameters (i.e. new cell-radio network temporary identifier (C-RNTI), target eNB security identifiers, optionally dedicated random access channel (RACH) preamble, and target eNB SIBS) and is commanded by a source eNB to perform the handover. The RRC procedure delay includes RRC connection reconfiguration including mobility control information and related reconfigurations. A Layer 2 reset/reconfiguration delay may be incurred due to reset media access control (MAC), re-establish/reconfigure packet data convergence protocol (PDCP) and radio link control (RLC) for all resource blocks (RBs) that are established, to enable integrity protection and ciphering of RRC messages. In a Layer 3 reconfiguration (e.g. measurement configuration), the maximum allowed delay for an RRC procedure is 15 milliseconds (ms) for a handover.

In step 2, the UE processing time for radio frequency (RF) or baseband re-tuning, security updating, deriving target eNB specific keys, or configuring security algorithm to be used in target cell, can be set to be approximately 20 ms.

In step 3, considering a typical RACH configuration where PRACH is available every 5 sub-frames, the minimum delay for this step can be set to be 0.5 ms and a typical delay would be 2.5 ms.

In step 4, PRACH preamble transmission may require one sub frame.

In steps 5 and 6, the target eNB responds with UL allocation and timing advance (TA) information that corresponds to random access response (RAR) information received from a target eNB. It is assumed that an LTE frequency division duplex (FDD) and sub-frame number are continuously numbered. If, the UE sends a RACH preamble in sub-frame n, the eNB can send RAR as early as in sub-frame n+3. Assuming that the grant decoding and/or TA delay is not included in this step, the minimum delay of this step would be 3 ms and a typical/average delay would be 5 ms.

In steps 7 and 8, the processing RRC message and transmission time interval (TTI) alignment and RRC reconfiguration transmission may be sent. In this step, the UE may access the target cell and the UE may send the RRC connection reconfiguration complete message (i.e. C-RNTI). The RRC connection reconfiguration message is send to confirm the handover, along with an uplink buffer status report, whenever possible, to the target eNB to indicate that the handover procedure has been completed for the UE. The target eNB may verify the C-RNTI sent in the RRC connection reconfiguration complete message. The target eNB may further begin to send data to the UE. The UE can then send the RRC connection reconfiguration complete message as early as after $K_1 \geq 6$ sub frames (i.e., the delay of this step is typically 6 ms). The delay includes a UE processing delay (decoding of scheduling grant and timing alignment and L1 encoding of UL data) and a transmission time for the RRC connection reconfiguration complete message.

The handover latency including the time taken for steps 1 to 8, as illustrated in FIG. 1B is provided in Table 1.

TABLE 1

| Message | Time (ms) |
| --- | --- |
| RRC HO command (step 1) | 15 |
| UE processing time for RF/baseband re-tuning (step 2) | 20 |
| Acquiring first available RACH in target cell (step 3) | 2.5 |
| PRACH preamble transmission (step 4) | 1 |
| UL allocation and TA transmission (steps 5, 6) | 5 |
| Processing RRC message and TTI alignment (step 7) | 3 |
| RRC message encapsulation and transmission (step 8) | 3 |
| Minimum/Typical Total delay | 49.5 |

FIG. 2A is an example scenario illustrating an HIT in a conventional vehicle-to-everything (V2X) communication.

An HO decision is transmitted from a road side small unit or small cell (i.e. vehicle-to-infrastructure (V2I)) to a UE. During an HO execution phase, a RACH procedure with the target base station may also be started. The data interruption during the HO can be approximately 49.5 milliseconds (ms). The delay in transmitting data may lead to an accident due to data interruption.

FIG. 2B is an example scenario illustrating an HIT in conventional e-Health services.

A surgeon may perform surgery remotely using robotic arms. The surgeon may send a first command to move hand-1 horizontally and a second command to stop moving the hand-1. Consider that while transmitting the second command, there is a blockage or obstruction which prevents the second command from reaching the robotic equipment. Due to the blockage or obstruction, the HO procedure may be performed and the delay may be approximately 49.5 ms. The delay in transmitting may cause the robotic hand-1 to move horizontally for a longer time and distance than the doctor intended, which in turn may cause an unnecessary cut during surgery.

Conventional systems relate to signaling aspects while performing a handover of an ongoing device-to-device (D2D) transfer to configure a communication resource pool and UE timing. These configurations may be communicated to a UE by a system information block (SIB) or through dedicated RRC signaling. Conventional systems may disclose methods to reduce the HIT by removing the latency caused by Internet service providers (ISPs) when the mobile station is performing a handover from a macro cell to a femto cell in a wireless communication network.

In another conventional system, a RACH-less handover may be performed, which in turn reduces the delay by approximately 10 to 12 ms. Further, a conventional system discloses reducing HIT by maintaining a source eNB connection during a handover for reducing data interruption by not releasing the connection to the source eNB until the handover is completed at the target eNB. A UE may reset the MAC and re-establish PDCP upon receiving the handover command and thus communication with the source eNB may be stopped. The data disruption may take place until the UE receives the first packet from the target eNB.

Conventional systems, however, may fail to provide a method to reduce handover interruption time or mobility interruption time for applications such as delay sensitive applications.

SUMMARY

The present disclosure has been made to address the above-mentioned problems and disadvantages, and to provide at least the advantages described below.

In accordance with an aspect of the present disclosure, a method for managing a handover procedure in a radio access network (RAN) is provided. The method includes initiating, by a source base station, a handover procedure for a first user equipment with a target base station, wherein the first user equipment is connected to the source base station; identifying, by the source base station, a second user equipment that functions as a relay device, for relaying data related to the first user equipment from the source base station to the first user equipment during the handover procedure; establishing, by the source base station, a first connection between the identified second user equipment and the first user equipment; transmitting, by the source base station, buffered data corresponding to the first user equipment, to the target base station; transmitting, by the source base station, at least one block of data from the buffered data to the first user equipment, via the second user equipment, during the handover procedure for the first user equipment from the source base station to the target base station; and disconnecting, by the source base station, the established first connection between the second user equipment and the first user equipment, upon receiving a sequence number (SN) status request message from the target base station.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
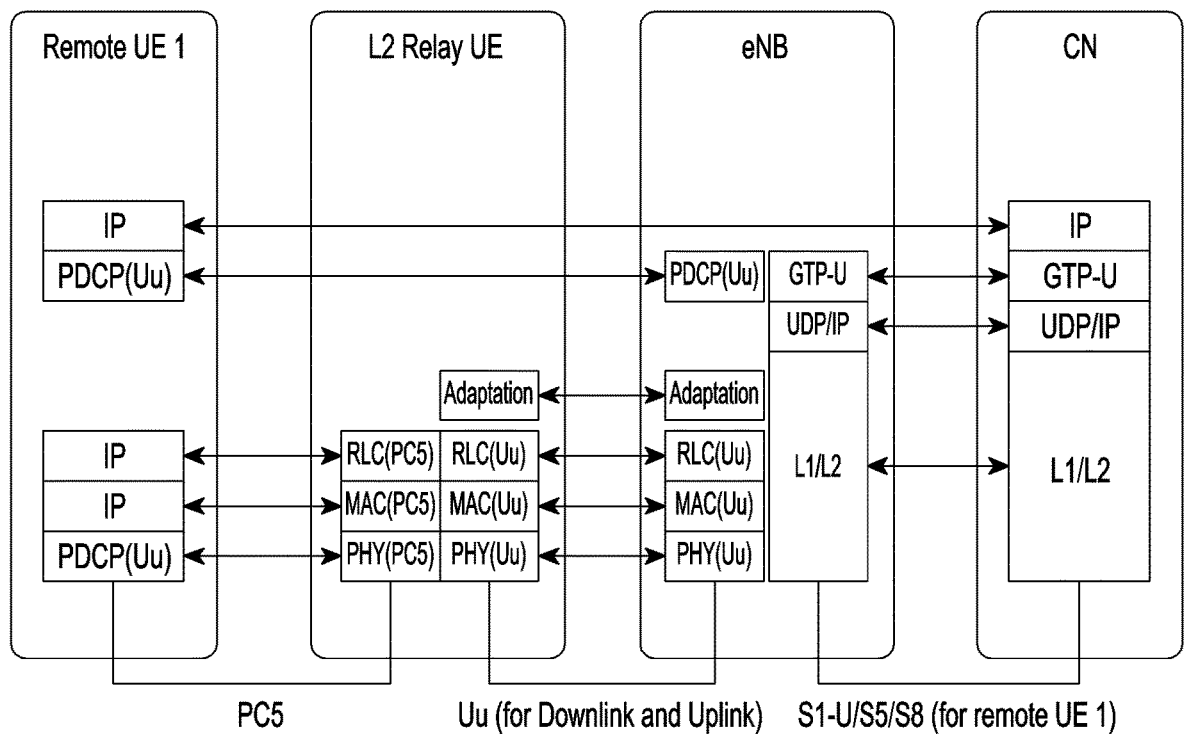
FIG. 1A illustrates a block diagram of a conventional user plane radio protocol stack for layer 2 evolved UE-to-network relay.
Figure 1B:
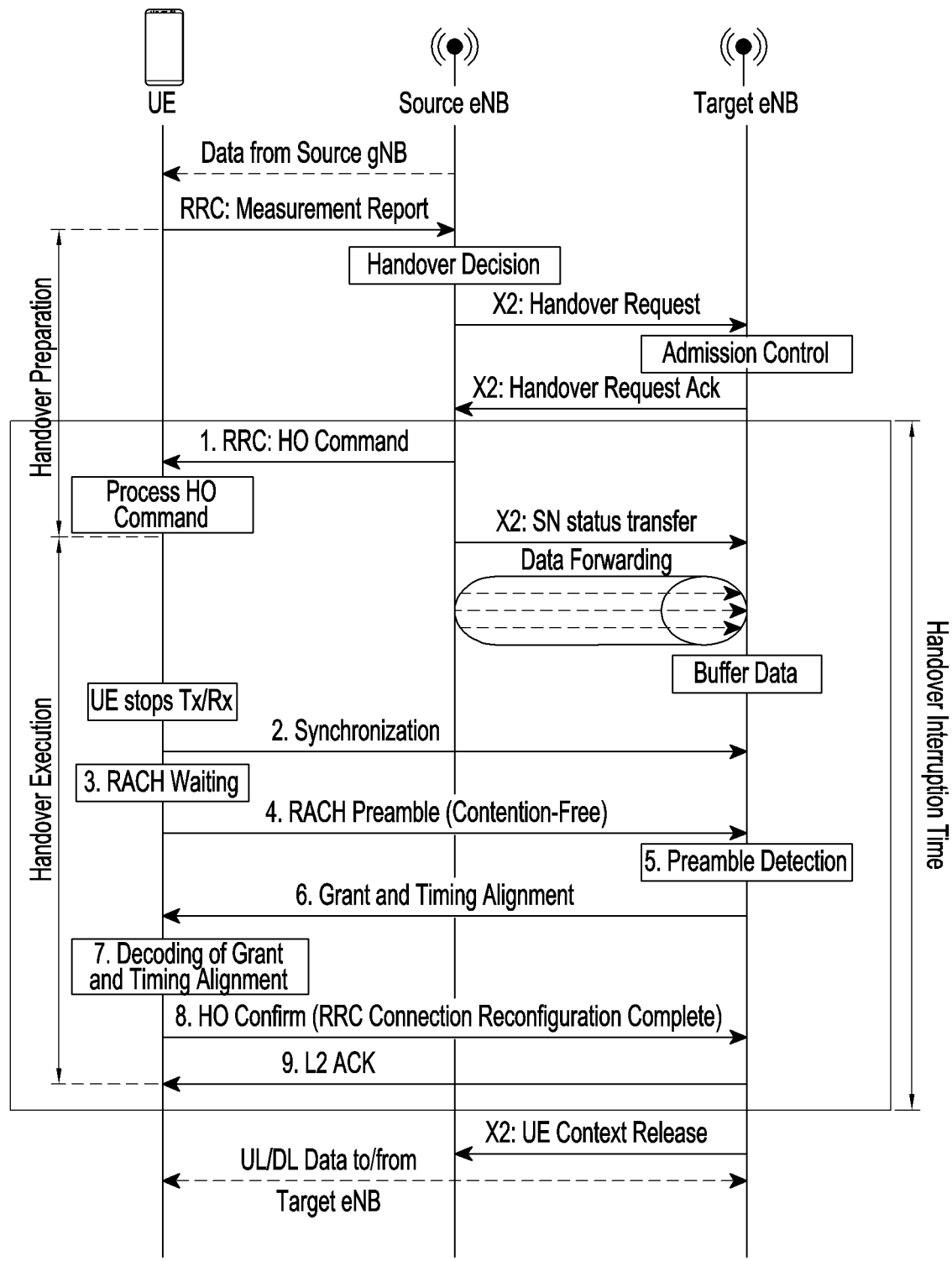
FIG. 1B illustrates a signaling diagram for a conventional handover operation and HIT required by an LTE network.
Figure 2A:
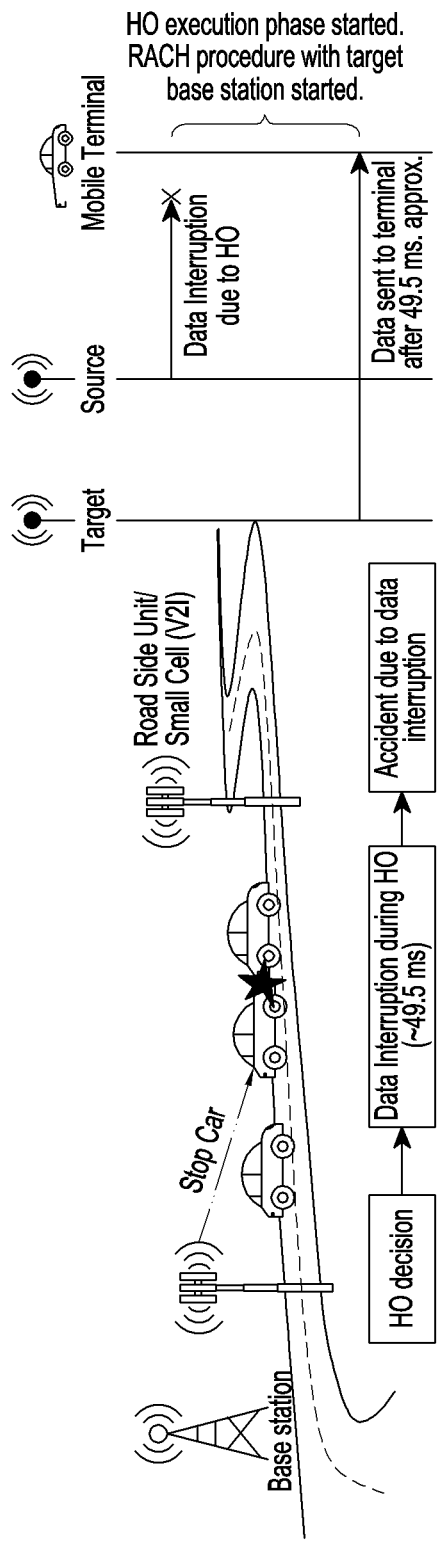
FIG. 2A is an example scenario illustrating an HIT in a conventional vehicle-to-everything (V2X) communication.
Figure 2B:
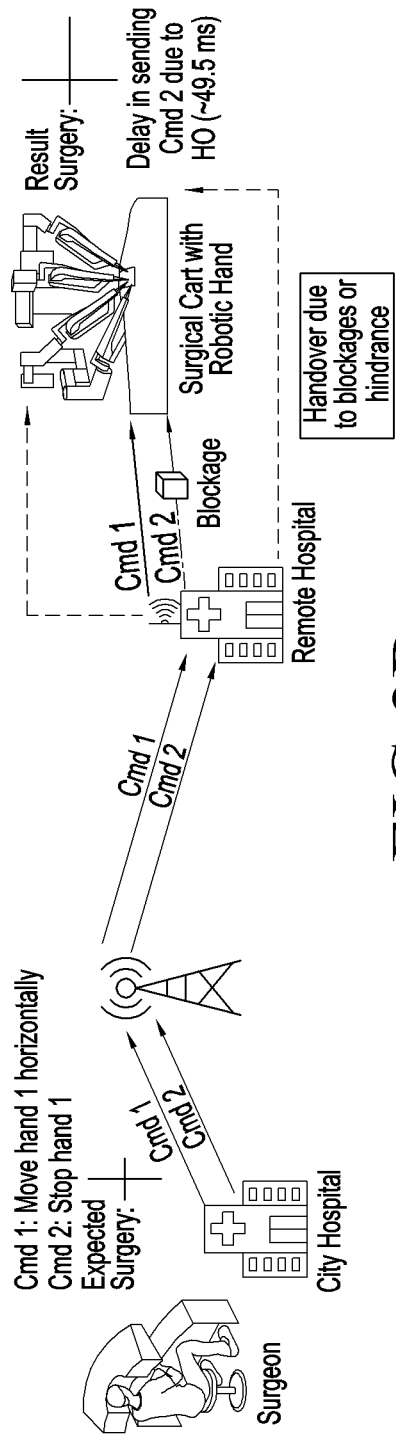
FIG. 2B is an example scenario illustrating an HIT in a conventional e-Health services.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

As used herein, singular terms such as "a," "an," and "the" may include the plural forms thereof unless the context clearly indicates otherwise. Thus, for example, reference to "a component surface" may include reference to one or more of such surfaces.

As used herein, the expressions "A or B", "at least one of A and B", "at least one of A or B", "one or more of A and B", and "one or more of A or B" may include any and all combinations of one or more of the associated listed items. Terms such as "A or B", "at least one of A and B", or "at least one of A or B" may refer any and all of the cases where at least one A is included, where at least one B is included, or where both of at least one A and at least one B are included.

Expressions including ordinal numbers, such as "first" and "second", may refer to corresponding components without implying an order of importance, and are merely used to distinguish each component from the others without unduly limiting the components.

It is to be understood that when an element (e.g., a first element) is referred to as being "operatively" or "communicatively" "coupled with", "coupled to", "connected with" or "connected to" another element (e.g., a second element), the element can be directly coupled with/to another element or coupled with/to another element via an intervening element (e.g., a third element). In contrast, when an element (e.g., a first element) is referred to as being "directly coupled with", "directly coupled to", "directly connected with" or "directly connected to" another element (e.g., a second element), it should be understood that there is no intervening element (e.g., a third element).

As used herein, the expressions "configured to" or "set to" may be interchangeably used with the expressions "suitable for", "having the capacity to", "designed to", "adapted to", "made to", or "capable of". The expressions "configured to" or "set to" should not be construed to only mean "specifically designed to" in hardware. Instead, the expression "a device configured to" may mean that the device is "capable of" operating together with another device or other components. For example, a "processor configured to perform A, B, and C" or a processor set to perform A, B, and C" may mean a dedicated processor (e.g., an embedded processor) for performing a corresponding operation or a generic-purpose processor (e.g., a central processing unit (CPU) or an application processor (AP)) which may perform corresponding operations by executing one or more software programs which are stored in a memory device.

The embodiments herein achieve methods and systems for managing a handover procedure in an RAN.

Figure 3:
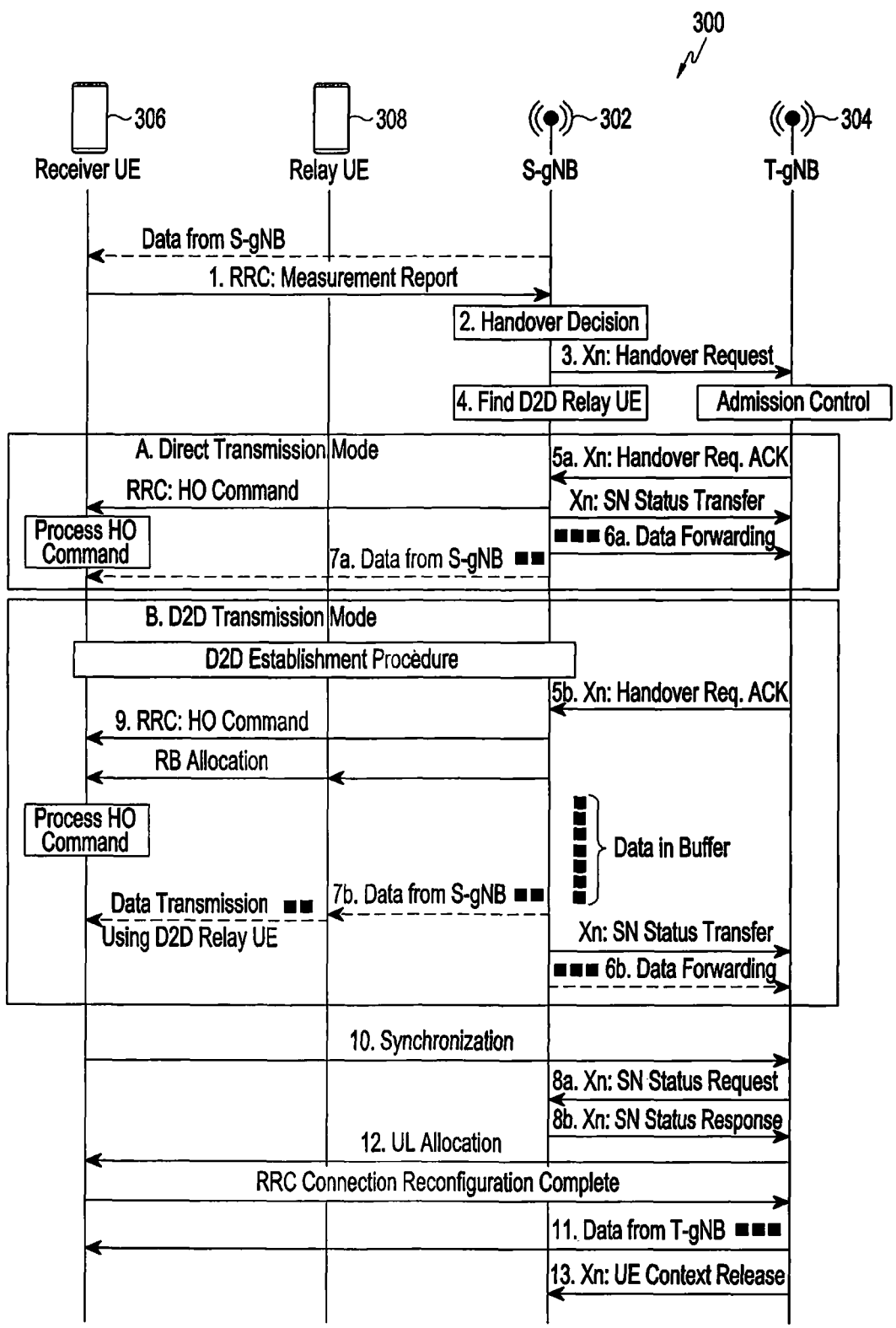
FIG. 3 illustrates a signaling diagram of a system for managing a handover procedure in an RAN, according to an embodiment.

FIG. 3 illustrates a signaling diagram of a system for managing a handover procedure in an RAN, according to embodiment.

The system 300 includes a source base station 302, a target base station 304, a first user equipment 306, and a second user equipment 308. The system 300 may include a RAN and a core network coupled together through a signaling interface. The RAN can be used in any cellular network such as 1G, 2G, 3G, 4G, and 5G The core network may include a mobility management entity (MME), a serving gateway (serving GW), and a packet data network gateway (PDN GW). The RAN includes eNBs that may operate as a base station for communicating with the first user equipment 306 or the second user equipment 308. The eNBs may include macro eNBs and low power (LP) eNBs. Further the system may also include a next generation Node B (gNB) that may operate as the source base station 302 (as shown in FIG. 3 as S-gNB) or the target base station 304 (as shown in FIG. 3 as T-gNB).

The MME may perform similar function(s) as the control plane of legacy serving general packet radio service (GPRS) support nodes (SGSN). The MME may manage mobility aspects such as gateway selection and tracking area list management. The serving GW may terminate the interface towards the RAN, and route data packets between the RAN and the core network. The eNBs or gNB may be in a cell, in which the eNBs or gNB of the cell may be controlled by the same processor or set of processors.

The eNBs/gNB may be in a single cell or a member of multiple cells. The eNBs/gNB may perform various logical functions for the RAN including, but not limited to, radio network controller functions (RNC) (such as radio bearer management, uplink and downlink dynamic radio resource management, and data packet scheduling) and mobility management.

The first user equipment 306 and the second user equipment 308 may be configured to communicate using orthogonal frequency-division multiplexing (OFDM) or cyclic prefix frequency-division multiplexing (CP-OFDM) communication, signaling with an eNBs/gNB over a multi-carrier communication channel in accordance with an OFDM communication protocol. OFDM signals may include a plurality of orthogonal subcarriers. Each eNBs/gNB may be able to transmit an RRC reconfiguration message to each first user equipment 306 or second user equipment 308 that may be connected to the eNBs/gNB. The RRC reconfiguration message may contain reconfiguration information including one or more parameters that indicate specifics about reconfiguration of the first user equipment 306 or the second user equipment 308 upon a mobility scenario (i.e. handover) to reduce the latency involved in the handover. The one or more parameters may include a physical layer and layer 2 reconfiguration indicators, and a security key update indicator. The one or more parameters may be used to instruct the first user equipment 306 or the second user equipment 308 to avoid or skip one or more of the processes indicated to decrease messaging between the first user equipment 306 or the second user equipment 308 and the network. The RRC reconfiguration message may include parameters such as measurement configuration, mobility control, radio resource configuration (i.e. including resource blocks (RBs), MAC main configuration and physical channel configuration), and security configuration. The network may be able to automatically route packet data between the first user equipment 306 and the second user equipment 308. The new eNBs/gNB may be able to provide desired information between the eNBs/gNB involved in the mobility.

Additionally, other wireless communication devices (such as wireless local area network (WLAN) devices including one or more access points (APs) and one or more stations (STAs) in communication with the AP may be present in the same geographical region as the RAN. An RB (also called a physical resource block (PRB)) may be the smallest unit of resources that can be allocated to the first user equipment 306 or the second user equipment 308. There may be several different physical downlink channels that can be conveyed using such resource blocks. Examples of these physical downlink channels may be the physical down link control channel PDCCH and the physical downlink shared channel PDSCH. Each sub-frame may be partitioned into the PDCCH and the PDSCH. A radio network temporary identifier (RNTI) may identify the second user equipment 308 for which the PDSCH is intended.

The second user equipment 308 can function as a relay device to reduce the handover latency in mobility scenarios. The eNBs/gNB may be a stationary non-mobile device or a mobile device. The first user equipment 306 or the second user equipment 308 may also include processing circuitry, such as one or more single-core or multi-core processors, and memory arranged to perform the operations described herein. The first user equipment 306 and/or the second user equipment 308 can be configured to operate in accordance with $3^{rd}$ generation partnership project (3GPP) standards or other protocols or standards, including Institute of Electrical and Electronic Engineers (IEEE) (802).16 wireless technology (WiMax), IEEE (802).11 wireless technology (WiFi), global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, technologies.

The first user equipment 306 described herein can be at least one of, but not limited to, a portable wireless communication device, such as a personal digital assistant (PDA), a laptop or portable computer with wireless communication capability, a web tablet, a wireless telephone, a smart-phone, a wireless headset, a pager, an instant messaging device, a digital camera, an access point, a television, a medical device (e.g., a heart rate monitor or a blood pressure monitor), a vehicle, a vehicle infotainment system, a robot, surgery equipment, factory equipment, an edge device, automation equipment, or another device that may receive and/or transmit information wirelessly.

The first user equipment 306 may include one or more user interfaces designed to enable user interaction with the system and/or peripheral component interfaces designed to enable peripheral component interaction with the system 300. For example, the first user equipment 306 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other input/output (I/O) components. The sensor may include a gyro sensor, an accelerometer, a proximity sensor, an ambient light sensor, and a positioning unit. The positioning unit may communicate with components of a positioning network, e.g., a global positioning system (GPS) satellite. The antennas may comprise one or more directional or omnidirectional antennas, including, for example, dipole antennas, monopole antennas, patch antennas, loop antennas, micro strip antennas or other types of antennas suitable for transmission of radio frequency (RF) signals. Multiple-input multiple-output (MIMO) antennas may be effectively separated to take advantage of spatial diversity and different channel characteristics.

The second user equipment 308 can be at least one of, but not limited to, a portable wireless communication device, such as a PDA, a laptop or portable computer with wireless communication capability, a web tablet, a wireless telephone, a smart-phone, a wireless headset, a pager, an instant messaging device, a digital camera, an access point, a television, a medical device (e.g., a heart rate monitor or a blood pressure monitor), a vehicle, a vehicle infotainment system, a robot, surgery equipment, factory equipment, an edge device, automation equipment, or another device that may receive and/or transmit information wirelessly.

The second user equipment 308 may include one or more user interfaces designed to enable user interaction with the system and/or peripheral component interfaces designed to enable peripheral component interaction with the system 300. For example, the second user equipment 308 may include one or more of a keyboard, a keypad, a touchpad, a display, a sensor, a non-volatile memory port, a USB port, an audio jack, a power supply interface, one or more antennas, a graphics processor, an application processor, a speaker, a microphone, and other I/O components. The sensor may include a gyro sensor, an accelerometer, a proximity sensor, an ambient light sensor, and a positioning unit. The positioning unit may communicate with components of a positioning network, e.g., a GPS satellite. The antennas may comprise one or more directional or omnidirectional antennas, including, for example, dipole antennas, monopole antennas, patch antennas, loop antennas, micro strip antennas or other types of antennas suitable for transmission of RF signals. MIMO antennas may be effectively separated to take advantage of spatial diversity and the different channel characteristics.

Embodiments of the present disclosure can be implemented in applications such as real time medical imaging in operation centers, real time medical imaging in intensive care units (ICUs), augmented reality assisted surgery, robotic aided surgery, remote robotic diagnosis, remote robotic operations, industrial applications within a limited area or region (e.g., in a factory, harbor, airport, or campus), enhanced mobile broadband (eMBB) applications, massive machine-type communication (mMTC) applications, and ultra-reliable and low-latency communication (URLLC) applications.

The handover may occur in communication networks, such as that shown in FIG. 3, when the eNBs/gNB serving the first user equipment 306 or the second user equipment 308 determines that a different eNBs/gNB can serve the first user equipment 306 or the second user equipment 308 rather than the source eNBs/gNB (referred herein as source base station 302). The handover may be either intra-network, between eNBs/gNB in a single network, or inter-network, between eNBs/gNB in different radio access technologies (RATs). Regardless of whether the handover is intra-network or inter-network, the handover process may take many operations and take a significant amount of time to complete. These operations may include the first user equipment 306 or the second user equipment 308 first measuring signal and/or channel parameters and transmitting the measured parameters to the source base station 302. The measured parameters may include signal-to-noise ratio measurements (SNR), signal-to-interference ratio measurements (SIR), and error rate. The source base station 302 may then determine whether to perform the handover based on a comparison between the parameters. The source base station 302 may determine that a handover is to be performed and send allocation and reconfiguration information to the first user equipment 306 or the second user equipment 308. The first user equipment 306 or the second user equipment 308 may subsequently detach (i.e., disconnect) from the source base station 302 and synchronize to the target base station 304.

The first user equipment 306 or the second user equipment 308 may be in an RRC connected mode in which user data is being actively communicated to an external entity, such as communication between the first user equipment 306 or the second user equipment 308, and the source base station 302. The first user equipment 306 or the second user equipment 308 may be in an RRC connected state, or an RRC inactive state in which the first user equipment 306 or the second user equipment 308 monitors various paging and control channels, takes channel measurements and provides feedback to the source base station 302, but user data is not actively communicated between the first user equipment 306 or the second user equipment 308 and the source base station 302.

In steps 1 and 2, the system 300 is configured to determine if the first user equipment 306 requires a handover procedure based on receiving a first RRC measurement report comprising of one or more measured parameters from the first user equipment 306. The first RRC measurement report from the first user equipment 306 may be obtained/received before the handover procedure. The source base station 302 may decide whether to proceed with the handover procedure of the first user equipment 306 based on the measurement parameters received from the first user equipment 306. The first RRC measurement report may include plurality of different measurement parameters and different ways to measure the signal quality of a current cell (serving cell) and a target cell (neighboring cell). The source base station 302 may allow first user equipment 306 to report the signal quality (i.e. RSRP) of the current cell (serving cell) and the target cell (neighboring cell), and to set handover rule(s).

In steps 3 and 4, the system 300 may be configured to initiate the handover procedure for the first user equipment 306 with the target base station 304. The first user equipment 306 may be connected to the source base station 302. The system 300 may be configured to transmit a handover request to the target base station 304, based on determining that the handover procedure is required by the first user equipment 306. The system 300 may be configured to identify the second user equipment 308 corresponding to an RRC connected state or an RRC inactive state, that can function as a relay device for relaying data related to the first user equipment 306 from the source base station 302 to the first user equipment 306 during the handover procedure.

The system 300 may be configured to send a request to the first user equipment 306 to transmit a second RRC measurement report during the handover procedure, to determine whether the second user equipment 308 is in proximity to the first user equipment 306. The second RRC report may include a list of RSRPs of the second user equipment 308 in proximity to the first user equipment 306. After a handover decision is made by the source base station 302, the source base station 302 may transmit a request to the first user equipment 306 to broadcast a beacon signal over a side-link channel. Relay devices (i.e., second user equipment 308) in the vicinity of the first user equipment 306, may respond to the beacon signal that is sent over the side-link channel. The first user equipment 306 may then respond to the source base station 302 with the second RRC measurement report of the received signal strength information or list of the RSRP values of the relay devices in the vicinity. The second user equipment 308 is identified after receiving the second RRC measurement report from the first user equipment 306, in response to the request from the source base station 302 to the first user equipment 306. The relay device such (i.e., the second user equipment 308) can be selected based on determining the data rate provided by the plurality of relay device(s), using signal strength information or a list of RSRP values in the second RRC measurement report received from the first user equipment 306. The system 300 is configured to determine if the identified second user equipment 308 is in proximity to the first user equipment 306 by analyzing at least one of a movement pattern and a cell range of the identified second user equipment 308.

In steps 5a and 5b, the system 300 is configured to establish a first connection between the identified second user equipment 308 and the first user equipment 306 upon receiving a handover acknowledgement from the target base station 304 in response to the handover request from the source base station 302. In steps 6a and 6b, the system 300 may be configured to transmit buffered data corresponding to the first user equipment 306 to the target base station 304. In step 7b, the system 300 may be configured to transmit at least one block of data from the buffered data via the connected second user equipment 308 during the handover procedure for the first user equipment 306, from the source base station 302 to the target base station 304. In step 13, the system 300 may be configured to disconnect, by the source base station 302, the established first connection between the second user equipment 308. In step 8a, the first user equipment 306 upon receiving an SN status request message from the target base station 304. For example, the source base station 302 may have 10 bytes of buffered data, and the source base station 302 may forward all 10 bytes of buffered data to the target base station 304. Further, if the target base station 304 requests an SN status at a later stage, then the source base station 302 may transmit the transferred SN, and the target base station 304 may transfer data, after receiving the SN, to the first user equipment 306 upon handover completion. In addition, during the handover execution, the source base station 302 may transfer 3 bytes of data to the first user equipment 306, and the next 7 bytes of data may be transferred from the target base station 304 after the handover completion.

The system 300 is configured to determine an appropriate mode of data transfer corresponding to at least one of a direct mode of communication and a D2D mode of communication, during the handover procedure. For example, the source base station 302 may transfer the data using either mode of operation (such as a direct mode of communication or a D2D mode of communication) to the first user equipment 306. The appropriate mode of data transfer may be determined based on calculating a data rate using the list of RSRP values corresponding to the second user equipment 308 in the second RRC measurement report that is received from the first user equipment 306. The system 300 may be configured to select at least one of the direct mode of communication and the D2D mode of communication, based on determining a data rate using the direct mode of communication and the D2D mode of communication. The direct mode of communication may be from the source base station 302 to the first user equipment device 306 and the D2D mode of communication may be from the source base station 302 to the first user equipment 306 via the second user equipment 308. In steps 7a and 7b, the system 300 may be configured to continue the transfer of at least one block of data to the first user equipment 306 after sending a handover command to the first user equipment 306 via at least one of the direct mode of communication and the D2D mode of communication.

The system 300 may be configured to establish a second connection between the first user equipment 306 and the target base station 304, along with simultaneously receiving the buffered data corresponding to the first user equipment 306, from the source base station 302. In steps 9 and 10, after receiving the HO command, the first user equipment 306 may start synchronization with the target base station 304. Further, the buffered data may be transferred from target base station 304, in parallel over an LTE X2 interface. In step 11, the system 300 may be configured to transmit the remaining blocks of data from the buffered data to the first user equipment 306 after completing the handover procedure.

In step 7b, transmitting, by the source base station 302, the at least one block of data from the buffered data to the first user equipment 306 via the connected second user equipment 308, may include notifying the second user equipment 308 to establish a connection corresponding to the D2D communication mode with the first user equipment 306. Transmitting, by the source base station 302, the at least one block of data from the buffered data to the first user equipment 306 via the connected second user equipment 308, may include establishing a one-to-one direct connection with the first user equipment 306 using a side-link transmission. Transmitting, by the source base station 302, the at least one block of data from the buffered data to the first user equipment 306 via the connected second user equipment 308, may include allocating uplink resources and downlink resources for the first user equipment to transmit the data. Transmitting, by the source base station 302, the at least one block of data from the buffered data to the first user equipment 306 via the connected second user equipment 308 may include, exchanging, by the first user equipment 306, a security message between the first user equipment 306 and the second user equipment 308 to establish the connection. Transmitting, by the source base station 302, the at least one block of data from the buffered data to the first user equipment 306 via the connected second user equipment 308 may include relaying, by the second user equipment 308, the data corresponding to first user equipment 306, from the source base station 302 to the first user equipment 306. Transmitting, by the source base station 302, the at least one block of data from the buffered data to the first user equipment 306 via the connected second user equipment 308 may include terminating the allocation of resources for the side-link transmission between the second user equipment 308 and the first user equipment 306 after completion of the handover procedure with the target base station 304, by the source base station 302.

The system 300 may be configured to determine that the second user equipment 308, that can function as the relay device, is not in the proximity of the first user equipment 306 based on the second RRC measurement report received from the first user equipment 306. In steps 5a and 5b, the system 300 may be configured to receive the handover acknowledgement from the target base station 304 in response to the initiated handover procedure. The system 300 may be configured to initiate a handover execution phase with the target base station 304 upon receiving the handover acknowledgement. In step 7b, the system 300 may be configured to transmit the at least one block of data from the buffered data to the first user equipment 306 during the handover execution phase. In steps 8a and 8b, the system 300 may be configured to transmit an SN status corresponding to an SN associated with the at least one block of transmitted data, to the target base station 304, based on receiving an SN status request message from the target base station 304, after completing synchronization with the first user equipment 306 and the target base station 304. In step 13, the system 300 may be configured to terminate the transmission of the remaining block of data from the buffered data corresponding to the first user equipment 306 based on completing the handover procedure by the source base station 302 with the target base station 304. Disconnecting the connection may include terminating, by the source base station 302, the allocation of the uplink transmission resources and downlink transmission resources for the first user equipment 306 for the direct mode of communication and the second user equipment 308 for the D2D mode of communication. The first user equipment 306 may be configured to connect with the source base station 302 and receive data from the second user equipment 308 via a first antenna array. The first user equipment 306 may be configured to obtain at least one of the handover procedure(s) and an uplink synchronization of the target base station 304 via a second antenna array. Determining the appropriate mode of data transfer may include analyzing an achievable data rate from the second user equipment 308, to select at least one of the D2D mode of communication or the direct mode of communication. Continuing the transfer of the at least one block of data to the first user equipment 306 may comprise enabling the first user equipment 306 to receive data without interruption when performing a RACH procedure with the target base station 304.

Embodiments of the present disclosure may be implemented in one or more of a combination of hardware, firmware, microcode, and resident software. In addition, embodiments may also be implemented as instructions stored on a computer-readable storage device, which may be read and executed by at least one processor to perform the operations described herein. The functions performed by various modules described herein may be implemented in other modules or combinations of other modules. A computer-usable or computer readable medium can be any apparatus that can comprise, store, communicate, propagate, or transport a program for use by or in connection with an instruction execution system, apparatus, or device.

Figure 4:
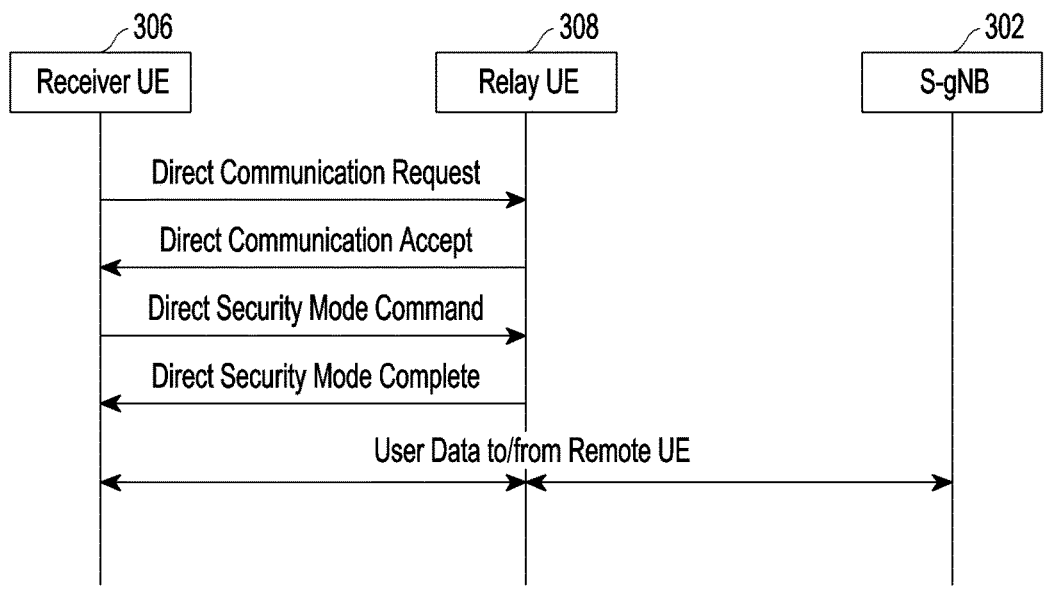
FIG. 4 illustrates a signaling diagram for a D2D communication establishment procedure, according to an embodiment.

FIG. 4 illustrates a signaling diagram for D2D communication establishment procedure, according to an embodiment.

During mode selection, the source base station 302 may request a second RRC measurement report from the first user equipment 306. Accordingly, the first user equipment 306 may transmit a beacon signal at a regular interval over the PC5 interface. The beacon signal may contain resource information such as remaining power in the user terminal or location of the user terminal. The neighboring user terminals (such as the second user equipment 308 that can act as a relay device) may respond to the transmitted beacon signal. The first user equipment 306 may prepare a list of RSRP values based on the received response from the neighboring user terminals in response to the beacon signal(s). The list of RSRP values may include the signal strength of the neighboring user terminals. The first user equipment may transmit the list of RSRP values to the source base station 302 in the second RRC measurement report. When the source base station 302 performs the handover decision, the source base station 302 may determine the relay device that can provide the maximum data rate for a D2D communication mode, using the signal strength information of each pair of RSRP values from the list of received RSRP values received from the first user equipment 306. The source base station 302 can calculate the data rate using Shannon's capacity equation (i.e., $C=B \log_2[1+(S/N)]$; where C is channel capacity in bits/second; B is channel bandwidth; S is received signal power in watts; and N is received noise power). The source base station 302 may also calculate the data rate for the direct mode using the signal strength of the receiver UE. The source base station 302 may then select the best mode of data transfer based on the calculated data.

Once the relay device (such as the second user equipment 308) is selected, the source base station 302 may inform the relay device to establish 402 a D2D connection with the receiver user terminal (such as the first user equipment 306). The relay device may then establish 402 a one-to-one direct connection with the receiver user terminal using the PC5 signaling protocol. The PC5 signaling protocol may provide direct connection management functions such as direct link setup/release, security parameter control 404, and IP address allocation. Once the relay device completes establishing 402 the D2D connection with the receiver user terminal, the relay device (second user equipment 308) may start relaying data from the source base station 302 to the receiver UE (first user equipment 306).

Figure 5:
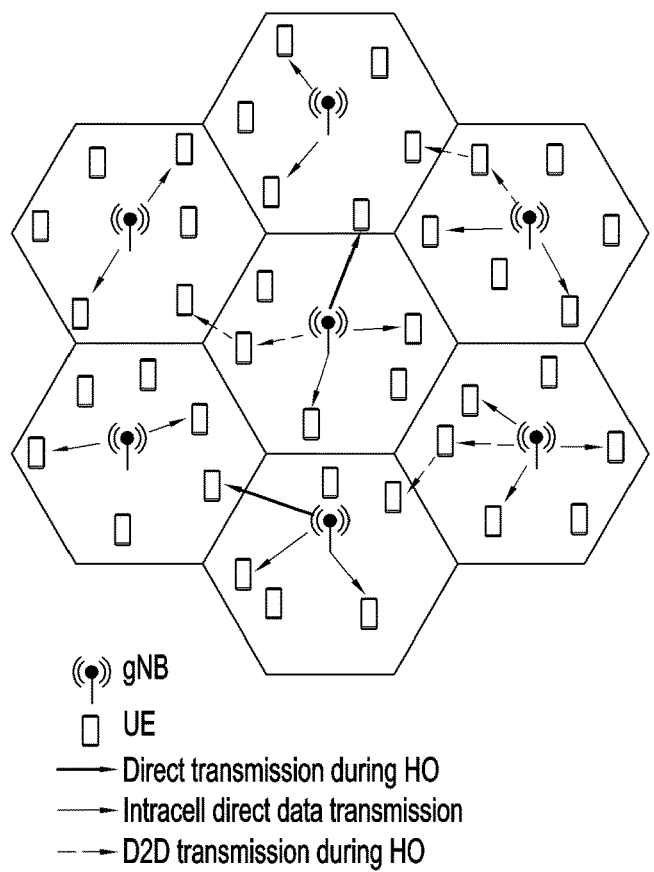
FIG. 5 illustrates a network model diagram of a system for managing a handover procedure in an RAN, according to an embodiment.

FIG. 5 illustrates network model diagram of a system for managing a handover procedure in the RAN, according to an embodiment.

The D2D mode of communication 502 may use short range communication and can be used to transfer data during a handover. The D2D mode of communication may improve the performance of the cell edge users to provide better SNR. In a given network, one or more RRC connected or RRC inactive second user equipment 308 devices may be present that can act as relay devices to transfer data. The gNB in the cell can be Source-gNB or Target-gNB. Any g-NB can act as Source-gNB or Target-gNB, however, one of the gNB at one instance can be Source-gNB or Target-gNB. When a gNB such Source-gNB (S-gNB) (i.e. source base station 302) receives the first RRC measurement report from the first user equipment 306, the gNB such as S-gNB may make a handover decision. When handover is required, the gNB such as S-gNB may transmit a handover request to the T-gNB (i.e. target base station 304) and simultaneously run the mode selection method. The S-gNB requests the first user equipment 306 to transmit the second RRC measurement report. Based on the received second RRC measurement report from the first user equipment 306, the S-gNB may select the relay device (i.e. second user equipment 308). Upon receiving the handover acknowledgment from the T-gNB, the S-gNB calculates the amount of data that can be transferred using the selected mode of data transfer. This may help in minimizing the probability of an empty buffer during a handover instant and also minimizing the probability of buffer over-run at T-gNB.

S-gNB may denote the total buffer size for S-gNB. The first user equipment 306 or the second user equipment 308 may be installed with a duplicated receiver chain that enables the first user equipment 306 or the second user equipment 308 to receive data while performing RF tuning. The duplicated receiver chain includes a plurality of antenna arrays (or duplicated antenna arrays) that the first user equipment 306 or the second user equipment 308 can transmit on and listen on in two different frequencies in parallel. Based on the selected mode of data transfer, such as direct mode of communication 504 or D2D mode of communication 502 for data transfer, the S-gNB may process the handover procedure.

When there is a relay device that can help transferring the buffered data at S-gNB with a better data rate than the direct mode of communication for data transfer, then the D2D mode of communication may be selected for transferring data. The relay device selected by the S-gNB may be allocated RBs for the D2D transfer between the relay device (i.e., the second user equipment 308) and the receiver UE (i.e., the first user equipment 306). After allocating the RB(s), data transmission may take place between the receiver UE and S-gNB using the relay UE. Once the RRC connection reconfiguration is complete, the receiving UE may start receiving data from the T-gNB. The HIT may be eliminated as the first user equipment 306 continues to receive the data during entire handover process.

The direct mode of communication 504 for data transfer can be selected when there is no relay device in the vicinity of the first user equipment 306, or when the data rate that is achieved using the direct mode of data transfer is higher than that of the D2D mode 502. Further, in case of the direct mode of data transfer 504 during a handover, data from the buffer can be transmitted to the first user equipment 306 from the S-gNB while executing the handover.

Figure 6A:
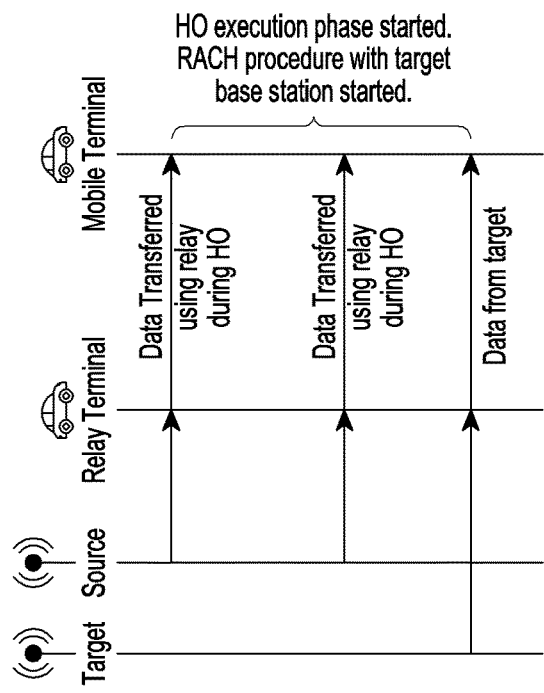
FIG. 6A is an example scenario illustrating an HIT in a V2X communication, according to an embodiment.
Figure 6A:
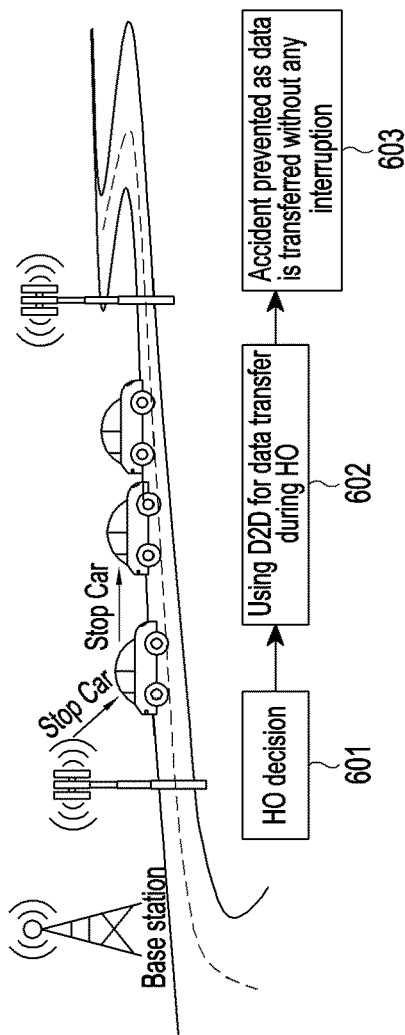

FIG. 6A is an example scenario illustrating an HIT in a V2X communication, according to embodiment.

In block 601, a HO decision may be made by a road side small unit or a small cell (i.e. vehicle-to-infrastructure (V2I)) acting as the source base station 302. During an HO execution phase, the RACH procedure with the target base station 304 (i.e. the road side small unit or small cell) may be started. In block 602, during the handover procedure the source base station 302 may transmit data to the selected relay device such as a second vehicle following behind the first vehicle. In block 603, the first vehicle may receive data from the second vehicle, and an accident may be avoided because the HIT is reduced. For example, the received data may inform the first vehicle to stop, thereby avoiding the accident. The buffered data may be transmitted to the first vehicle via the target base station 304 after the handover procedure is completed from the source base station 302 to the target base station 304.

Figure 6B:
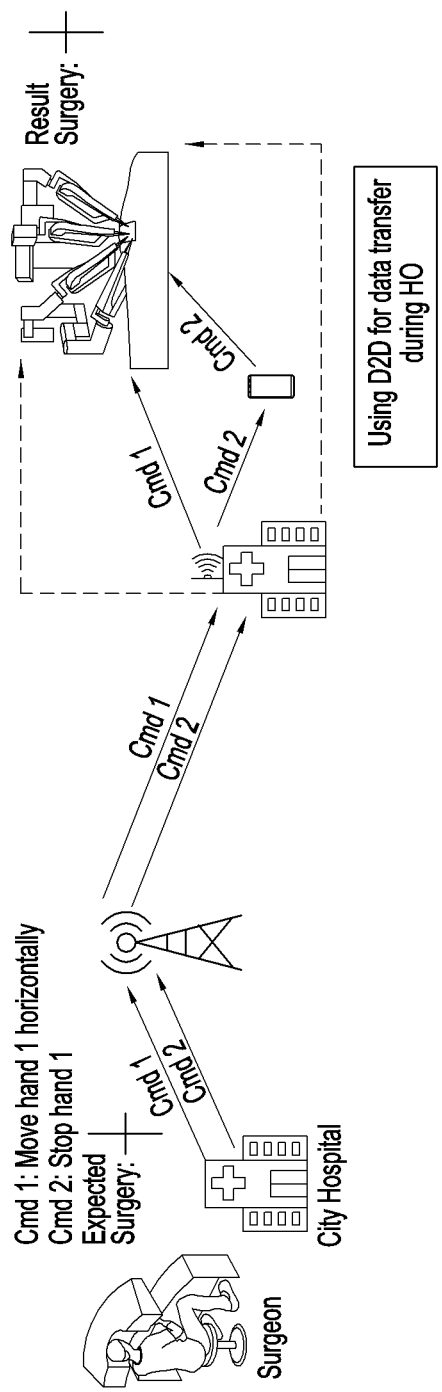
FIG. 6B is an example scenario illustrating an HIT in an e-Health service, according to an embodiment.

FIG. 6B is an example scenario illustrating an HIT in an e-Health service, according to an embodiment.

A surgeon may perform surgery remotely using robotic arms. The surgeon may send a first command Cmd1 to move a hand horizontally and may send a second command Cmd2 to stop moving the hand. While transmitting the second command Cmd2, there may be a blockage or obstruction which prevents the second command from reaching the robotic equipment. Due to such a blockage or obstruction, the HO procedure may be performed. During the HO procedure the second command Cmd2 may be relayed to the second user equipment such as a mobile device. The relay device may then transfer the second command to the robotic equipment without any delay.

Figure 7:
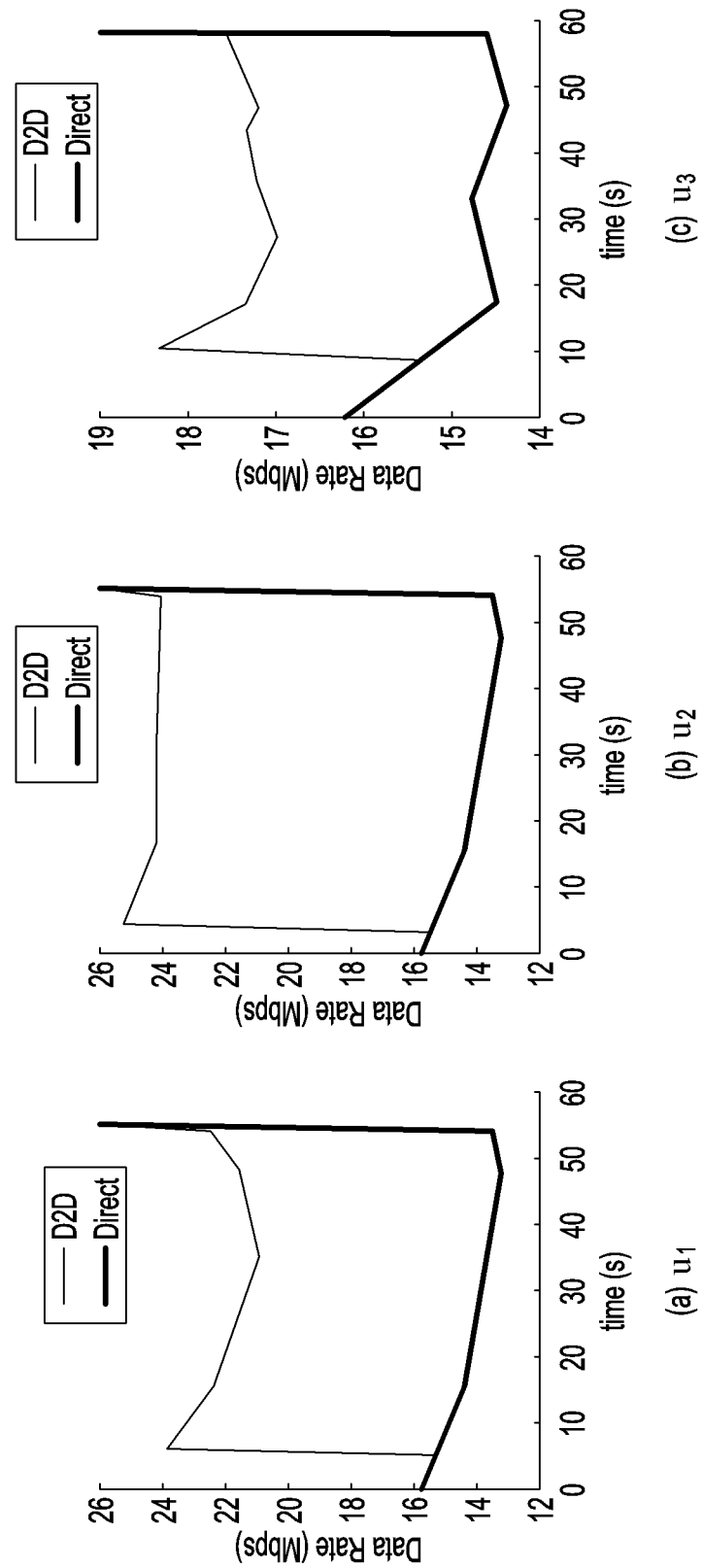
FIG. 7 is an example scenario illustrating graphs for comparing a handover data rate for different user equipment (UE), according to an embodiment.

FIG. 7 is an example scenario illustrating graphs for comparing a handover data rate for different UEs, according to an embodiment.

The data rate comparison graph of the modes of data transfer for three UEs (u1, u2, and u3), such as the first user equipment 306, is shown in FIG. 7. For example, the u1, u2, and u3, can be different type of UEs such as smart phone, vehicle, medical equipment, and so on. The graphs depict a comparison of data rates for the D2D mode of communication and the direct mode of communication. As shown in the FIG. 7, the data transmission may never stop during the entire duration of the handover, in turn achieving no data interruption during a handover operation. Accordingly, no data interruption may be observed and an almost zero ms HIT can be achieved. Further, in all the UEs, the D2D mode of data transfer may provide higher throughput than the direct mode of data transfer. The amount of data transferred may increase as the number of UEs in the given region is increased. Further, the probability of the number of RRC connected or RRC inactive UEs may increase with the increase in the total number of UEs.

The appropriate D2D relay device may be selected during the mode selection method. The data rate for each mode of operation may be calculated as provided in Equations (1) and (2).

$$DR_{Direct} = B \times \{\log_2[1 + SNR_b^x]\} \qquad (1)$$

$$DR_{D2D} = \frac{1}{2} \times B \max_{u \in \zeta_b - \{x\}} \{\log_2[1 + \min\{SNR_b^u, SNR_u^x\}]\} \qquad (2)$$

$DR_{D2D}$ and $DR_{direct}$ respectively denote a data rate for D2D mode and a data rate for direct mode, b denotes an S-gNB, x denotes a receiving UE associated with $\zeta_b$, denotes a set of all UEs associated with a gNB b, and B denotes bandwidth. In Equations (1) and (2), $SNR_t^{\check{r}}$ denotes the SNR from transmitter t to receiver ř, which is calculated using the signal strength received in the RRC measurement report of the receiver UE, such as first user equipment 306.

Figure 8A:
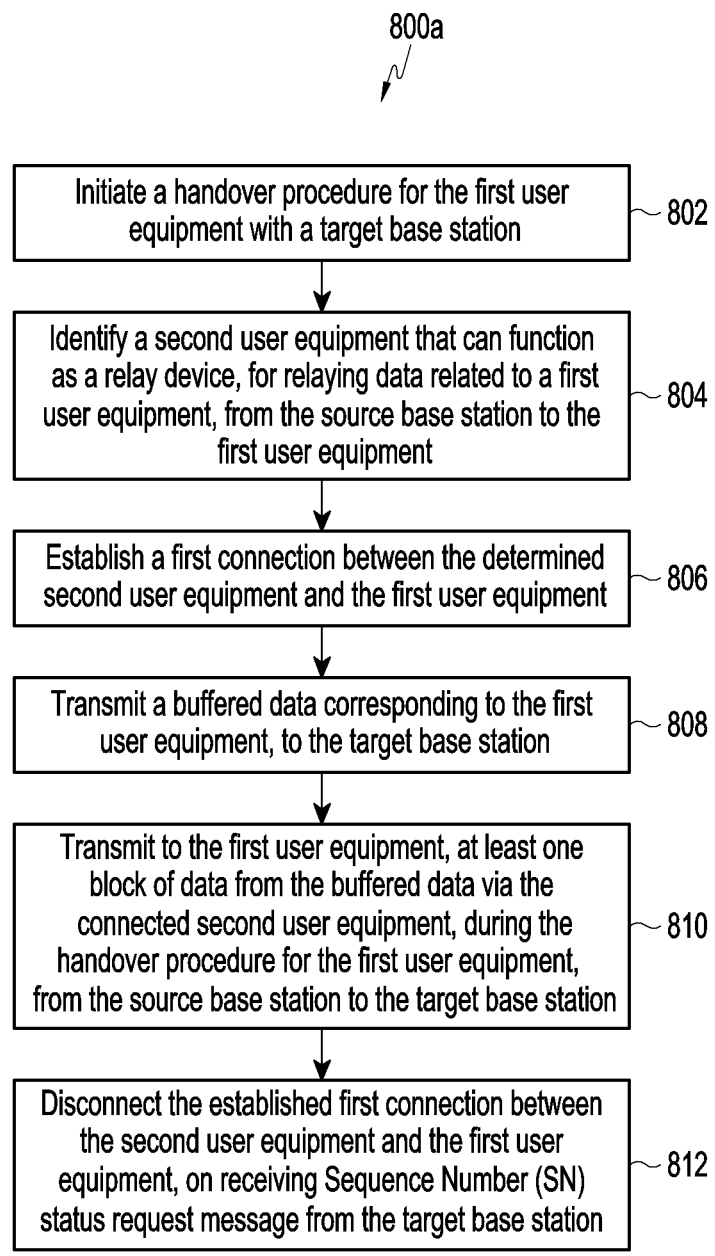
FIG. 8A illustrates a flow chart depicting a method for managing a handover procedure in the RAN, according to an embodiment.

FIG. 8A illustrates a flow chart depicting a method 800a for managing a handover procedure in the RAN, according to an embodiment.

At step 802, the method 800a includes initiating, by the source base station 302, the handover procedure for the first user equipment 306 with the target base station 304. At step 804, the method 800a includes identifying, by the source base station 302, the second user equipment 308 that can function as a relay device, for relaying data related to the first user equipment 306 from the source base station 302. At step 806, the method 800a includes establishing, by the source base station 302, the first connection between the determined second user equipment 308 and the first user equipment 306. At step 808, the method 800a includes transmitting, by the source base station 302, the buffered data corresponding to the first user equipment 306, to the target base station 304. At step 810, the method 800a includes transmitting, by the source base station 302, to the first user equipment 306, at least one block of data from the buffered data via the connected second user equipment 308, during the handover procedure for the first user equipment 306 from the source base station 302 to the target base station 304. At step 812, the method 800a includes disconnecting, by the source base station 302, the established first connection between the second user equipment 308 and the first user equipment 306 upon receiving the SN status request message from the target base station 304.

The various actions in method 800a may be performed in the order presented, in a different order or simultaneously. Further, in some embodiments, some steps listed in FIG. 8A may be omitted.

Figure 8B:
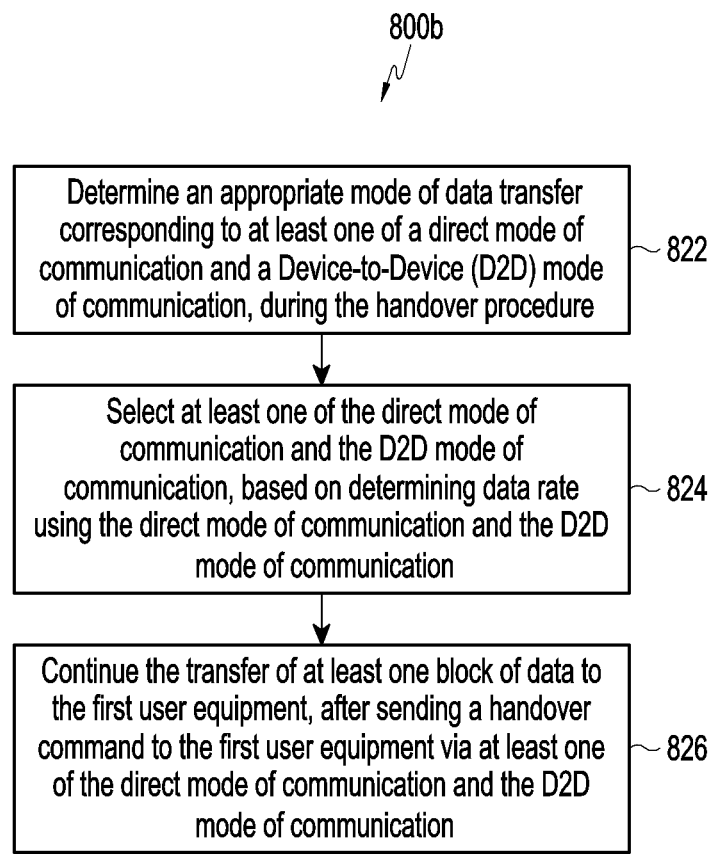
FIG. 8B illustrates a flow chart depicting a method for determining an appropriate mode of data transfer, according to an embodiment.

FIG. 8B illustrates a flow chart depicting a method 800b for determining the appropriate mode of data transfer, according to an embodiment.

At step 822, the method 800b includes determining, by the source base station 302, an appropriate mode of data transfer corresponding to at least one of a direct mode of communication and a D2D mode of communication, during the handover procedure. At step 824, the method 800b includes selecting, by the source base station 302, at least one of the direct mode of communication and the D2D mode of communication, based on a determined data rate using the direct mode of communication and the D2D mode of communication. At step 826, the method 800b includes continuing, by the source base station 302, the transfer of at least one block of data to the first user equipment 306, after sending a handover command to the first user equipment 306 via at least one of the direct mode of communication and the D2D mode of communication.

The various actions in method 800b may be performed in the order presented, in a different order or simultaneously. Further, in some embodiments, some steps listed in FIG. 8B may be omitted.

Figure 8C:
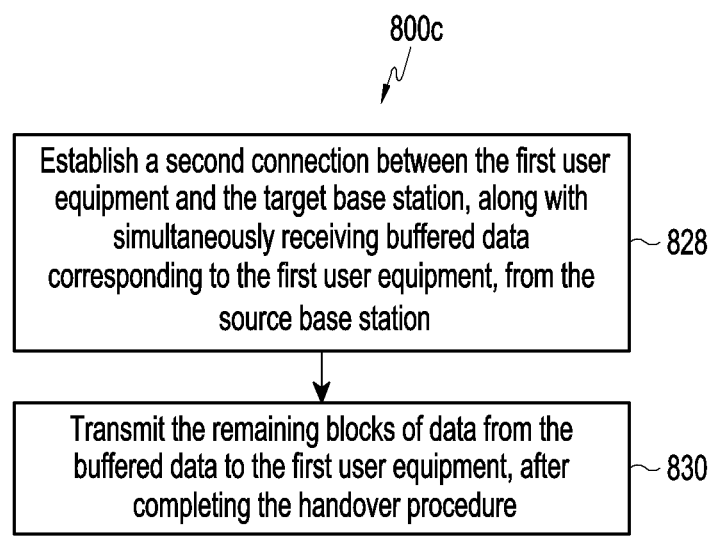
FIG. 8C illustrates a flow chart depicting a method for transmitting received buffered data corresponding to a first user equipment, according to an embodiment.

FIG. 8C illustrates a flow chart depicting a method 800c for transmitting the received buffered data corresponding to the first UE, according to an embodiment.

At step 828, the method 800c includes establishing, by the target base station 304, the second connection between the first user equipment 306 and the target base station 304, along with simultaneously receiving buffered data corresponding to the first user equipment 306 from the source base station 302. At step 830, the method 800c includes transmitting, by the target base station 304, the remaining blocks of data from the buffered data to the first user equipment 306 after completing the handover procedure.

The various actions in method 800c may be performed in the Order presented, in a different order or simultaneously. Further, in some embodiments, some steps listed in FIG. 8C may be omitted.

Figure 8D:
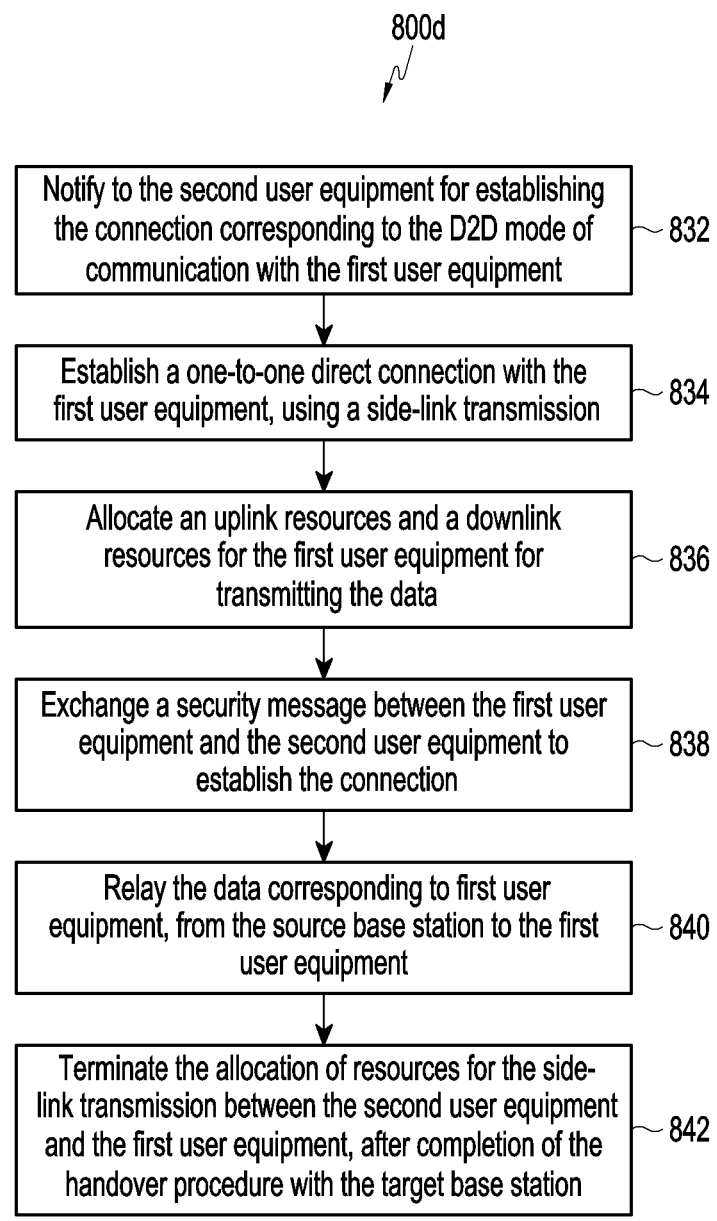
FIG. 8D is a flow chart depicting a method for relaying data corresponding to the first user equipment, according to an embodiment.

FIG. 8D is a flow chart depicting a method 800d for relaying the data corresponding to the first user equipment 306, according to an embodiment.

At step 832, the method 800d includes notifying, by the source base station 302, the second user equipment 308 to establish the connection with the first user equipment 306 corresponding to the D2D mode of communication. At step 834, the method 800d includes establishing, by the second user equipment 308, a one-to-one direct connection with the first user equipment 306, using a side-link transmission. At step 836, the method 800d includes allocating, by the source base station 302, uplink resource(s) and downlink resource(s) for the first user equipment 306 for transmitting the data. At step 838, the method 800d includes exchanging, by the first user equipment 306, a security message between the first user equipment 306 and the second user equipment 308 to establish the connection. At step 840, the method 800d includes relaying, by the second user equipment 308, the data corresponding to the first user equipment 306, from the source base station 302 to the first user equipment 306. At step 842, the method 800d includes terminating, by the source base station 302, an allocation of resources for the side-link transmission between the second user equipment 308 and the first user equipment 306, after completion of the handover procedure with the target base station 304.

The various actions in method 800d may be performed in the order presented, in a different order or simultaneously. Further, in some embodiments, some steps listed in FIG. 8D may be omitted.

Figure 8E:
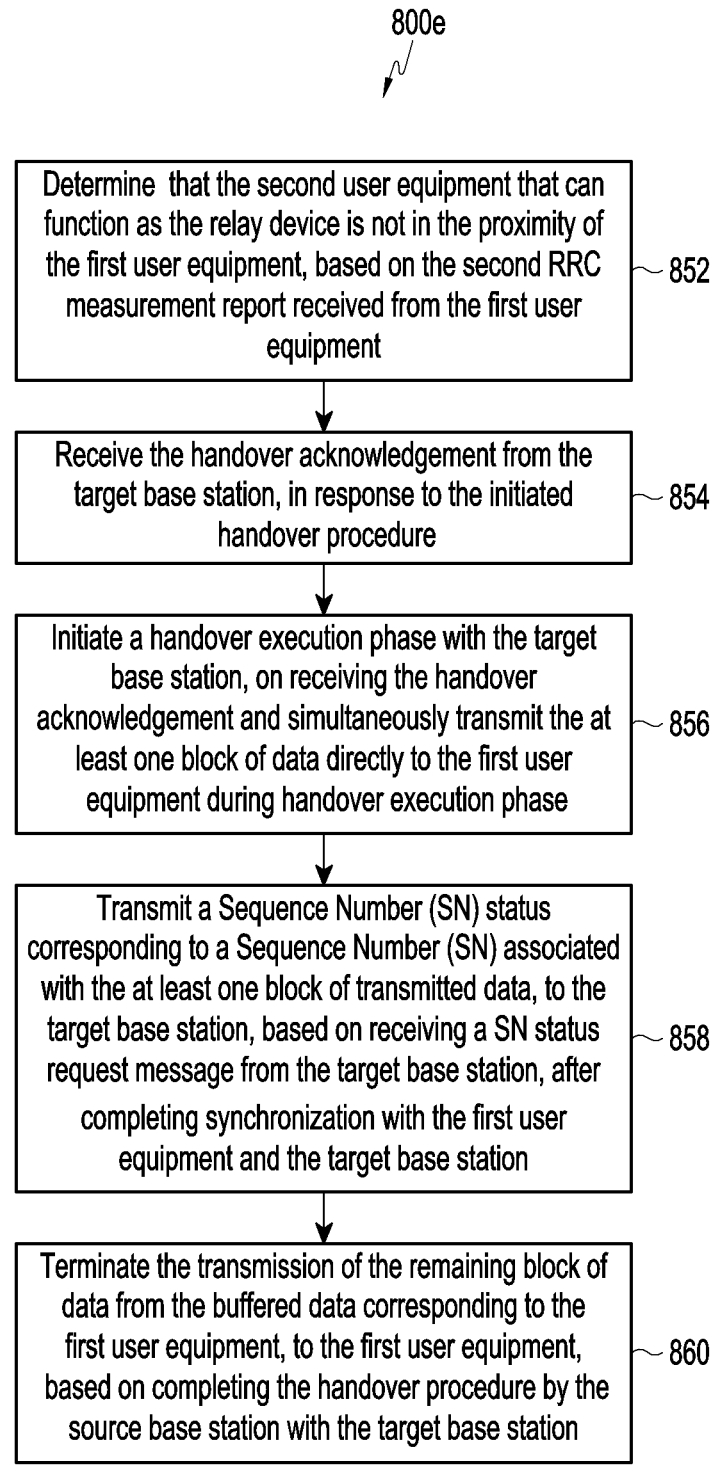
FIG. 8E is a flow chart depicting a method for transmitting an SN status corresponding to an SN associated with the transferred data, according to an embodiment.

FIG. 8E is a flow chart depicting a method 800e for transmitting SN status corresponding to the SN associated with the transferred data, according to an embodiment.

At step 852, the method 800e includes determining, by the source base station 302, that the second user equipment 308 that can function as the relay device is not in the proximity of the first user equipment 306, based on the second RRC measurement report received from the first user equipment 306. At step 854, the method 800e includes receiving, by the source base station 302, the handover acknowledgement from the target base station 304, in response to the initiated handover procedure. At step 856, the method 800e includes initiating, by the source base station 302, the handover execution phase with the target base station 304 upon receiving the handover acknowledgement and simultaneously transmitting, by the source base station 302, the at least one block of data from the buffered data directly to the first user equipment 306 during the handover execution phase. At step 858, the method 800e includes transmitting, by the source base station 302, an SN status corresponding to a SN associated with the at least one block of transmitted data to the target base station 304, based on receiving an SN status request message from the target base station 304, after completing synchronization with the first user equipment 306 and the target base station 304. At step 860, the method 800e includes terminating, by the source base station 302, the transmission of the remaining block of data from the buffered data corresponding to the first user equipment 306, to the first user equipment 306, based on completing the handover procedure by the source base station 302 with the target base station 304.

The various actions in method 800e may be performed in the order presented, in a different order or simultaneously. Further, in some embodiments, some steps listed in FIG. 8E may be omitted.

The embodiments described by the present disclosure may transfer data to the user terminal from the base station during a handover execution period to achieve almost zero milliseconds data interruption. Embodiments herein may use PC5 communication link to transfer the data buffered at the source base station during handover execution phase. Thus, the data will be transferred to the user terminal without any interruption during the entire handover procedure. Hence, the latency requirement of mobile communication(s) such as 5G communication(s) can be achieved. The embodiments disclosed herein may be used in a call control processing component.

The embodiments described herein may be implemented in delay sensitive applications of a 5G wireless network and achieve high throughput in ultra-reliable low latency communication (URLLC) applications such as factory automation, remote motion control, smart grids, and self-driving cars. The embodiments described herein may enhance the quality of experience (QoE) of the end user, as they will not experience any data interruption during a handover, and data will be transmitted with high reliability using D2D communication. The spectral efficiency of the network may increase due to the reduction in the number of HARQ retransmissions. The spectral reuse of the cellular network will increase due to short range communication involved in D2D communication.

The embodiments disclosed herein can be implemented through at least one software program running on at least one hardware device and performing network management functions to control the elements. The elements shown in FIG. 3 and FIG. 4 can be at least one of a hardware device, or a combination of a hardware device and a software module.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method for managing a handover procedure in a radio access network (RAN), comprising:

initiating, by a source base station, the handover procedure for a first user equipment with a target base station, wherein the first user equipment is connected to the source base station;

identifying, by the source base station, a second user equipment to directly relay data related to the first user equipment from the source base station to the first user equipment during the handover procedure based on radio resource control (RRC) measurement report received from the first user equipment;

selecting, by the source base station, at least one of a direct mode of communication and a device-to-device (D2D) mode of communication, based on a data rate for using the direct mode of communication and a data rate for using the D2D mode of communication during the handover procedure, wherein the direct mode of communication is based on communication from the source base station to the first user equipment and the D2D mode of communication is based on communication from the source base station to the first user equipment via the second user equipment; and in case that the D2D mode of communication is selected:

controlling, by the source base station, the first user equipment and the second user equipment to establish a first connection between the first user equipment and the second user equipment, in response to selecting the D2D mode of communication;

transmitting, by the source base station, buffered data corresponding to the first user equipment, to the target base station;

transmitting, by the source base station, at least one block of data from the buffered data to the first user equipment, via the second user equipment, during the handover procedure for the first user equipment from the source base station to the target base station;

transmitting, to the target base station, by the source base station, a sequence number (SN) status corresponding to an SN associated with the at least one block of data based on receiving an SN status request message from the target base station; and controlling, by the source base station, to disconnect the established first connection between the second user equipment and the first user equipment.

2. The method of claim 1, further comprising continuously transferring, by the source base station, at least one block of data to the first user equipment after transmitting a handover command to the first user equipment using the selected mode.

3. The method of claim 1, wherein transmitting, by the source base station, the at least one block of data from the buffered data to the first user equipment via the second user equipment, further comprises:

notifying, by the source base station, the second user equipment to establish the connection to correspond to the D2D mode of communication with the first user equipment; and allocating, by the source base station, uplink resources and downlink resources for a side-link transmission between the first user equipment and the second user equipment, wherein the at least one block of data is transmitted, from the second user terminal to the first user terminal, via the side link transmission using the allocated resources.

4. The method of claim 1, further comprising:
in case that the direct mode of communication is selected:
receiving, by the source base station, a handover acknowledgement from the target base station, in response to the initiated handover procedure;
initiating, by the source base station, a handover execution phase with the target base station, for receiving the handover acknowledgement and simultaneously transmitting by the source base station, at least one block of data from the buffered data directly to the first user equipment during the handover execution phase; and
terminating, by the source base station, the transmission of a remaining block of data from the buffered data corresponding to the first user equipment, to the first user equipment, based on completing the handover procedure by the source base station with the target base station,
wherein the direct mode of communication is selected in case that the second user equipment that functions as a relay device is determined to be not in the proximity of the first user equipment, based on the RRC measurement report received from the first user equipment.

5. The method of claim 1, wherein identifying the second user equipment further comprises analyzing the second user equipment by at least one of an RRC connected state condition and an RRC inactive state condition.

6. The method of claim 1, wherein the second user equipment is identified based on at least one of a data rate that is provided by the second user equipment and a proximity of the second user equipment to the first user equipment.

7. The method of claim 1, wherein disconnecting the connection further comprises terminating, by the source base station, the allocation of resources for the side-link transmission between the second user equipment and the first user equipment, after completion of the handover procedure with the target base station.

8. The method of claim 2, wherein the mode is selected based on calculating a data rate using a list of reference signal received power (RSRP) values received in the RRC measurement report, from the first user equipment.

9. The method of claim 2, wherein continuously transferring the at least one block of data to the first user equipment further comprises enabling the first user equipment to receive data without interruption while performing a random access channel (RACH) procedure with the target base station.

10. An apparatus for managing a handover procedure in a radio access network (RAN), comprising:
a transceiver configured to communicate with a user equipment; and
at least one processor coupled to the transceiver,
wherein the at least one processor is configured to:
initiate the handover procedure for a first user equipment with a target base station, wherein the first user equipment is connected to a source base station,
identify, by the source base station, a second user equipment to directly relay data related to the first user equipment from the source base station to the first user equipment during the handover procedure based on a radio resource control (RRC) measurement report received from the first user equipment,
select, by the source base station, at least one of a direct mode of communication and a device-to-device (D2D) mode of communication, based on a data rate for using the direct mode of communication and a data rate for using the D2D mode of communication during the handover procedure, wherein the direct mode of communication is based on communication from the source base station to the first user equipment and the D2D mode of communication is based on communication from the source base station to the first user equipment via the second user equipment, and
in case that the D2D mode of communication is selected:
control the first user equipment and the second user equipment to establish a first connection between the first user equipment and the second user equipment, in response to selecting the D2D mode of communication,
control the transceiver to transmit buffered data corresponding to the first user equipment, to the target base station,
control the transceiver to transmit at least one block of data from the buffered data to the first user equipment, via the second user equipment, during the handover procedure for the first user equipment from the source base station to the target base station,
control the transceiver to transmit, to the target base station, a sequence number (SN) status corresponding to an SN associated with the at least one block of data based on receiving an SN status request message from the target base station, and
control to disconnect the established first connection between the second user equipment and the first user equipment, upon receiving the SN status request message from the target base station.

11. The apparatus of claim 10, wherein the at least one processor is configured to
continuously transfer at least one block of data to the first user equipment after transmitting a handover command to the first user equipment using the selected mode.

12. The apparatus of claim 10, wherein the at least one processor is further configured to:
notify the second user equipment to establish the connection to correspond to the D2D mode of communication with the first user equipment; and
allocate uplink resources and downlink resources for a side-link transmission between the first user equipment and the second user equipment,
wherein the at least one block of data is transmitted, from the second user terminal to the first user terminal, via the side link transmission using the allocated resources.

13. The apparatus of claim 10, wherein the at least one processor is further configured to:
in case that the direct mode of communication is selected:
control the transceiver to receive a handover acknowledgement from the target base station, in response to the initiated handover procedure,
initiate a handover execution phase with the target base station, for receiving the handover acknowledgement and control the transceiver to simultaneously transmit the at least one block of data from the buffered data directly to the first user equipment during the handover execution phase, and
terminate the transmission of a remaining block of data from the buffered data corresponding to the first user equipment, to the first user equipment, based on completing the handover procedure by the source base station with the target base station, wherein the direct mode of communication is selected in case that the second user equipment that functions as a relay device is determined to be not in the proximity of the first user equipment, based on the RRC measurement report received from the first user equipment.

14. The apparatus of claim 10, wherein the at least one processor is configured to analyze the second user equipment by at least one of an RRC connected state condition and an RRC inactive state condition.

15. The apparatus of claim 10, wherein the at least one processor is configured to identify the second user equipment based on at least one of a data rate that is provided by the second user equipment and a proximity of the second user equipment to the first user equipment.

16. The apparatus of claim 10, wherein the at least one processor is configured to terminate the allocation of resources for the side-link transmission between the second user equipment and the first user equipment, after completion of the handover procedure with the target base station.

17. The apparatus of claim 11, wherein the mode is selected based on calculating a data rate using a list of reference signal received power (RSRP) values received in the RRC measurement report, from the first user equipment.

18. The apparatus of claim 11, wherein the at least one processor is configured to enable the first user equipment to receive data without interruption while performing a random access channel (RACH) procedure with the target base station.

\* \* \* \* \*